(12) United States Patent
Maeda et al.

(10) Patent No.: US 8,176,244 B2
(45) Date of Patent: May 8, 2012

(54) INFORMATION PROCESSING DEVICE, INFORMATION RECORDING MEDIUM, INFORMATION PROCESSING METHOD AND COMPUTER PROGRAM

(75) Inventors: Tetsuhiro Maeda, Kanagawa (JP); Kenichiro Aridome, Kanagawa (JP)

(73) Assignee: Sony Corporation, Tokyo (JP)

( * ) Notice: Subject to any disclaimer, the term of this patent is extended or adjusted under 35 U.S.C. 154(b) by 468 days.

(21) Appl. No.: 12/443,033

(22) PCT Filed: Sep. 20, 2007

(86) PCT No.: PCT/JP2007/068277
§ 371 (c)(1),
(2), (4) Date: May 26, 2009

(87) PCT Pub. No.: WO2008/041491
PCT Pub. Date: Apr. 10, 2008

(65) Prior Publication Data
US 2010/0097905 A1   Apr. 22, 2010

(30) Foreign Application Priority Data
Sep. 27, 2006 (JP) .................................. 2006-261711

(51) Int. Cl.
*G06F 12/16* (2006.01)
(52) U.S. Cl. ........................................ 711/112; 711/116
(58) Field of Classification Search .................. 711/112, 711/116
See application file for complete search history.

(56) References Cited

U.S. PATENT DOCUMENTS

| | | | |
|---|---|---|---|
| 5,978,336 A | 11/1999 | Mine et al. | |
| 6,988,931 B1* | 1/2006 | Martinet et al. | 450/57 |
| 7,408,895 B2* | 8/2008 | Zhang et al. | 370/318 |
| 7,693,021 B2* | 4/2010 | Teranishi | 369/53.24 |
| 2003/0012104 A1 | 1/2003 | Shishido | |
| 2005/0135213 A1 | 6/2005 | Shishido | |
| 2006/0233079 A1* | 10/2006 | Teranishi | 369/53.24 |
| 2009/0257329 A1* | 10/2009 | Kato et al. | 369/47.15 |

FOREIGN PATENT DOCUMENTS

| | | |
|---|---|---|
| EP | 1 187 111 A2 | 3/2002 |
| EP | 1 603 121 A1 | 12/2005 |

(Continued)

OTHER PUBLICATIONS

Extended Search Report issued Nov. 24, 2010 in EP Application No. 07807641.1. Office Action issued Sep. 20, 2011, in Japanese Patent Application No. 2006-261711.

*Primary Examiner* — Michael Tran
(74) *Attorney, Agent, or Firm* — Oblon, Spivak, McClelland, Maier & Neustadt, L.L.P.

(57) ABSTRACT

Provided are a device and a method for identifying whether or not an information recording medium is a pre-formatted disc, and an information recording medium as a pre-formatted disc. In an information processing device that executes recording of data onto a disc, such as a video camera, a process of identifying which one of the following discs a loaded disc is, that is, whether the loaded disc is (a) an unrecorded blank disc, (b) a pre-formatted disc to which a padding process has been applied, or (c) an already-recorded disc, is executed as a process of recognizing the loaded disc. With this configuration, a padding process that needs to be executed during a formatting process or finalizing process in conventional devices becomes unnecessary, thus enabling quick processing without making the user wait during the start of recording or finalizing process.

18 Claims, 7 Drawing Sheets

FOREIGN PATENT DOCUMENTS

| | | |
|---|---|---|
| JP | 10 1121666 | 4/1998 |
| JP | 11 3570 | 1/1999 |
| JP | 2002 324002 | 11/2002 |
| JP | 2003 257021 | 9/2003 |
| JP | 2005-203001 | 7/2005 |
| JP | 2006 40369 | 2/2006 |
| WO | WO 01/22416 A1 | 3/2001 |
| WO | 01 54123 | 7/2001 |
| WO | WO 2004/100159 A1 | 11/2004 |

\* cited by examiner

FIG. 2

| DISC TYPE (PHYSICAL FORMAT) | |
|---|---|
| DVD-R | WRITE-ONCE (WRITTEN ONCE) |
| DVD+R | WRITE-ONCE (WRITTEN ONCE) |
| DVD-RW | REWRITABLE (ERASABLE AND REWRITABLE) |
| DVD+RW | REWRITABLE (ERASABLE AND REWRITABLE) |

FIG. 6

| APPLICATION FORMAT | |
|---|---|
| DVD-Video (VIDEO) | CAN BE PLAYED BACK BY MANY DVD PLAYERS (HAS HIGH COMPATIBILITY) |
| DVD+RW Video Recording (+VR) | FORMAT SUITED FOR MOVING IMAGE RECORDING, HAS HIGH COMPATIBILITY, AND ALLOWS EASY EDITING OF RECORDED CONTENT |
| DVD Video Recording (VR) | FORMAT SUITED FOR REAL-TIME RECORDING OF MOVING IMAGES, AND ALLOWS SOPHISTICATED EDITING PROCESS SUCH AS PROCESS UTILIZING VIRTUAL-EDITING PLAYLIST |
| AVCHD (HD) | FORMAT SUITED FOR RECORDING OF High Definition (HD) IMAGES |

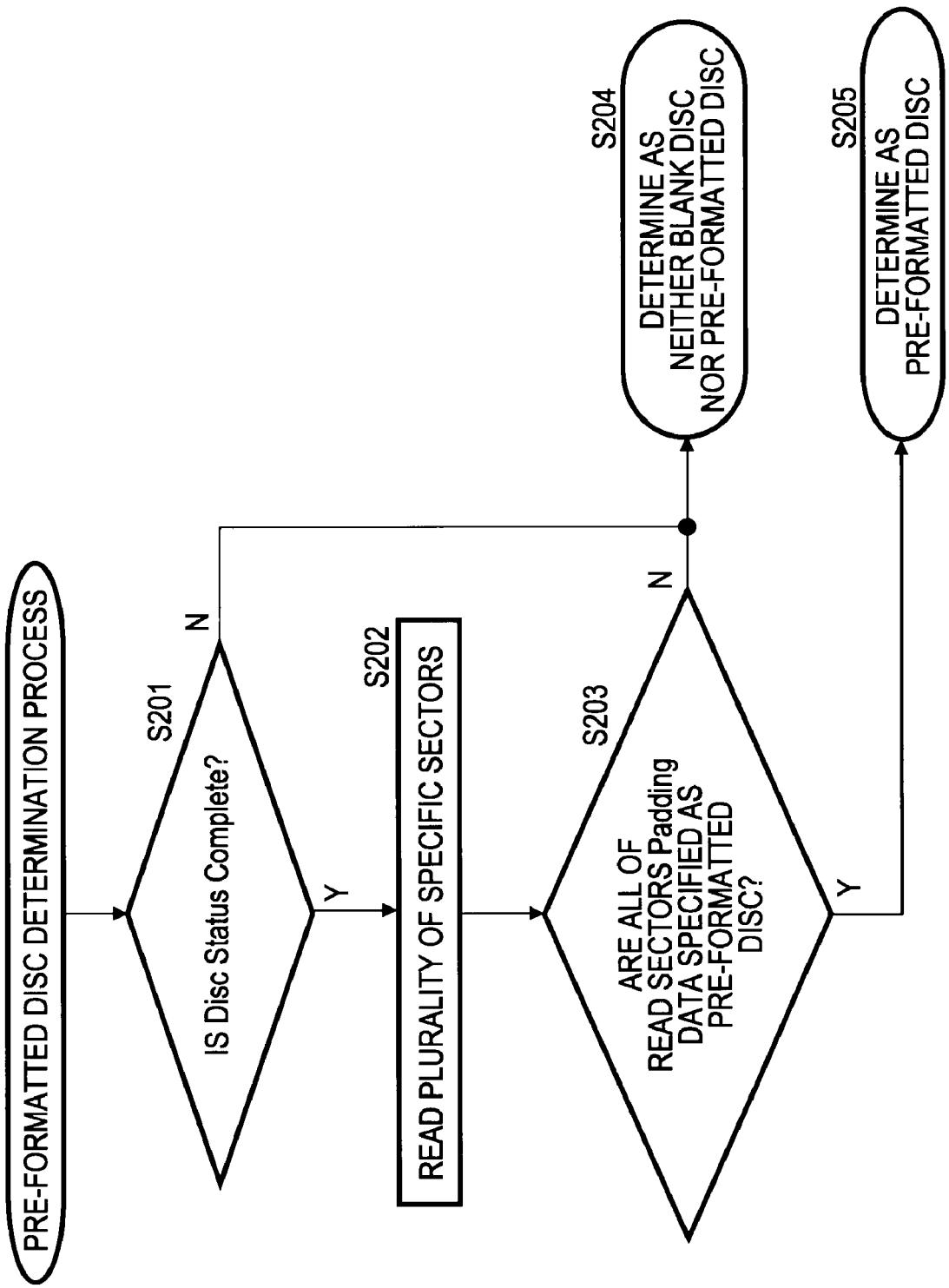

INFORMATION PROCESSING DEVICE, INFORMATION RECORDING MEDIUM, INFORMATION PROCESSING METHOD AND COMPUTER PROGRAM

TECHNICAL FIELD

The present invention relates to an information processing device, an information recording medium, and an information processing method, and a computer program, and relates to an information recording medium to which a padding process has been applied in advance, and further, an information processing device and an information processing method, and a computer program which execute an identification process of various information recording media.

BACKGROUND ART

Recently, with increases in the recording capacity of disc-shaped recording media, a type of video camera has emerged which stores moving images or still images on a disc instead of a conventional videotape. Since disc-shaped recording media allow random access, a favorite scene can be found efficiently. For example, because of superior image quality and superior usability such as the editing capability, the users of DVD video cameras are increasing year by year.

The important points to consider in ensuring physical compatibility among commercial DVD drives and pieces of consumer recording and playback equipment are the data recording radius and the state of the mirror surface. The data recording radius is the radius from the inner circumference of a disc on which data is actually recorded, and the mirror surface is the state of a disc surface when data is not recorded at all. When many mirror surface portions remain on a disc, there are quite a few cases in which the disc cannot be played back on a player that executes a playback process, that is, a typical player having a DVD-ROM drive.

For example, in the case where data recording is performed using DVD-RW as an example of a disc that allows data writes, to load this disc into a typical DVD-ROM drive for playback, a data recording radius of 70 mm or more is required. Also, in the case of DVD+RW as an example of a disc that allows data writes, to load the disc into a typical DVD-ROM drive for playback, a data recording radius of 30 mm or more is required. In this way, a data recording radius of a certain size or more is required to ensure physical compatibility. Also, to ensure higher compatibility, it is preferable that no mirror surface remain on the disc.

Accordingly, in many of DVD recording devices such as video cameras, to attain high physical compatibility, that is, to enable playback on a typical player having a DVD-ROM drive, if there is not much recorded data, a process is performed in which dummy data is written into an unrecorded area, thereby reducing a mirror surface as the unrecorded area.

For example, during the course of the formatting process at the time of start of recoding or the like, or the finalizing process at the end of recording or disc ejection, a process is performed in which a dummy padding process of recording dummy data into an unrecorded area of data is carried out so that no mirror surface remains.

However, this dummy padding process is a process that requires some length of time, and if the process is executed as a process performed before the start of recording, the user is made to wait until it becomes possible to start recording, so there is a problem in that the shooting/recording timing is missed. Also, in the case where the process is executed as a process performed before disc ejection, it takes time until the disc is ejected from the device, so there is a disadvantage of making the user wait.

DISCLOSURE OF INVENTION

Technical Problem

The present invention has been made in view of the above-described problems, and accordingly it is an object of the present invention to provide an information recording medium as a disc to which a padding process has been applied in advance, and further, to provide an information processing device and an information processing method, and a computer program which execute disc discrimination, such as whether a disc loaded in a device that executes data recording is a pre-formatted disc to which a padding process has been applied, a blank disc (disc that is completely unrecorded) which has not completed a physical formatting process, or a used disc, for example.

Technical Solution

A first aspect of the present invention represents an information processing device into which an information recording medium is loaded, the information recording medium being rewritable and requiring a finalizing process for allowing playback of recorded data on another playback device, characterized in that the information processing device includes determining means for determining if the loaded information recording medium is a pre-formatted disc in which a padding process as a part of the finalizing process has been applied to a predetermined recording area.

Further, an embodiment of the information processing device according to the present invention is characterized in that the determining means determines if the recording medium is a blank disc on which no data is recorded, on the basis of physical management information recorded on the recording medium.

Further, an embodiment of the information processing device according to the present invention is characterized in that the determining means executes a process of identifying a type of logical format of the recording medium, and determining that the recording medium is a pre-formatted disc if it is determined that the logical format of the recording medium is not a predetermined format.

Further, an embodiment of the information processing device according to the present invention is characterized in that the determining means reads data of a predetermined size from a predetermined area of the recording medium, and determines that the recording medium is the pre-formatted disc if it is determined that the data is pre-specified recorded information corresponding to a pre-formatted disc, in a determination process of determining if the recording medium is a pre-formatted disc.

Further, an embodiment of the information processing device according to the present invention is characterized in that the determining means reads data of a predetermined size from a predetermined area of the recording medium, and determines that the recording medium is the pre-formatted disc if it is determined that descriptive information indicating that the recording medium is a pre-formatted disc is contained in the data, in a determination process of determining if the recording medium is a pre-formatted disc.

Further, a second aspect of the present invention represents an information recording medium which is rewritable and requires a finalizing process for allowing playback of recorded data on another playback device, characterized in that the information recording medium has, in a user data recording area of the information recording medium, a padding data area that records pre-specified data as information indicating that the information recording medium is a pre-formatted disc, and an information processing device that records data onto the information recording medium can recognize that the information recording medium is the pre-formatted disc on the basis of the data recorded in the padding data area.

Further, an embodiment of the information recording medium according to the present invention is characterized in that the information recording medium is an optical recording medium.

Further, an embodiment of the information recording medium according to the present invention is characterized in that information indicating a data recording range is recorded at the end of the padding data area.

Further, an embodiment of the information recording medium according to the present invention is characterized in that the padding data area is set so as not to leave a mirror surface area as a data-unrecorded area on the optical recording medium.

Further, an embodiment of the information recording medium according to the present invention is characterized in that the padding data area is set so as to partially leave a mirror surface area as a data-unrecorded area at the end of the recording area on the optical recording medium.

Further, a third aspect of the present invention represents an information processing method which is executed in an information processing device into which an information recording medium is loaded, the information recording medium being rewritable and requiring a finalizing process for allowing playback of recorded data on another playback device, characterized in that: the information processing method executes a determining step of determining, by determining means, if the information recording medium loaded in the information processing device is a pre-formatted disc in which a padding process as a part of the finalizing process has been applied to a predetermined recording area.

Further, an embodiment of the information processing method according to the present invention is characterized in that the determining step is a step of determining if the recording medium is a blank disc on which no data is recorded, on the basis of physical management information recorded on the recording medium.

Further, an embodiment of the information processing method according to the present invention is characterized in that the determining step is a step of identifying a type of logical format of the recording medium, and determining that the recording medium is a pre-formatted disc if it is determined that the logical format of the recording medium is not a predetermined format.

Further, an embodiment of the information processing method according to the present invention is characterized in that the determining step is a step of reading data of a predetermined size from a predetermined area of the recording medium, and determining that the recording medium is the pre-formatted disc if it is determined that the data is pre-specified recorded information corresponding to a pre-formatted disc, in a determination process of determining if the recording medium is a pre-formatted disc.

Further, an embodiment of the information processing method according to the present invention is characterized in that the determining step is a step of reading data of a predetermined size from a predetermined area of the recording medium, and determining that the recording medium is the pre-formatted disc if it is determined that descriptive information indicating that the recording medium is a pre-formatted disc is contained in the data, in a determination process of determining if the recording medium is a pre-formatted disc.

Further, a fourth aspect of the present invention represents a computer program for causing information processing to be executed in an information processing device into which an information recording medium is loaded, the information recording medium being rewritable and requiring a finalizing process for allowing playback of recorded data on another playback device, characterized in that the computer program causes determining means to execute a determining step of determining if the information recording medium loaded in the information processing device is a pre-formatted disc in which a padding process as a part of the finalizing process has been applied to a predetermined recording area.

Incidentally, the computer program according to the present invention is, for example, a computer program that can be provided to a computer system capable of executing various program codes via a storage medium or communication medium that is provided in a computer-readable format, for example, a recording medium such as a CD, FD, or MO, or via a communication medium such as a network. By providing such a program in a computer-readable format, processes corresponding to the program are realized on the computer system.

Other objects, features, and advantages of the present invention will become apparent from the following detailed description of embodiments of the present invention and the accompanying drawings. Incidentally, the term system as used in this specification refers to a logical collection of a plurality of devices, and is not limited to one in which the individual component devices are located within the same housing.

Advantageous Effects

According to a configuration of an embodiment of the present invention, in an information processing device that executes data recording onto a disc, for example, a video camera or the like, a process of identifying which one of the following discs a loaded disc is, that is, whether the loaded disc is (a) an unrecorded blank disc,
(b) a pre-formatted disc to which a padding process has been applied, or
(c) an already-recorded disc, is executed as a process of recognizing the loaded disc. This configuration enables handling of a pre-formatted disc that is an information recording medium according to an embodiment of the invention of the present application. Also, when the pre-formatted disc is used, a padding process that needs to be executed during a formatting process or finalizing process in conventional devices becomes unnecessary, thus enabling quick processing without making the user wait during the start of recording or finalizing process. Further, since only a padding process is applied in advance to the pre-formatted disc that is an information recording medium according to an embodiment of the invention of the present application without limiting its logical format, the logical format can be selected at the time of its initial use.

BRIEF DESCRIPTION OF DRAWINGS

FIG. 2 is a diagram illustrating kinds (physical formats) of disc.

FIG. 6 is a diagram illustrating kinds of application format.

FIG. 7 is a diagram showing a flowchart illustrating the sequence of processes executed by an information processing device according to an embodiment of the present invention.

BEST MODE FOR CARRYING OUT THE INVENTION

Figure 1:
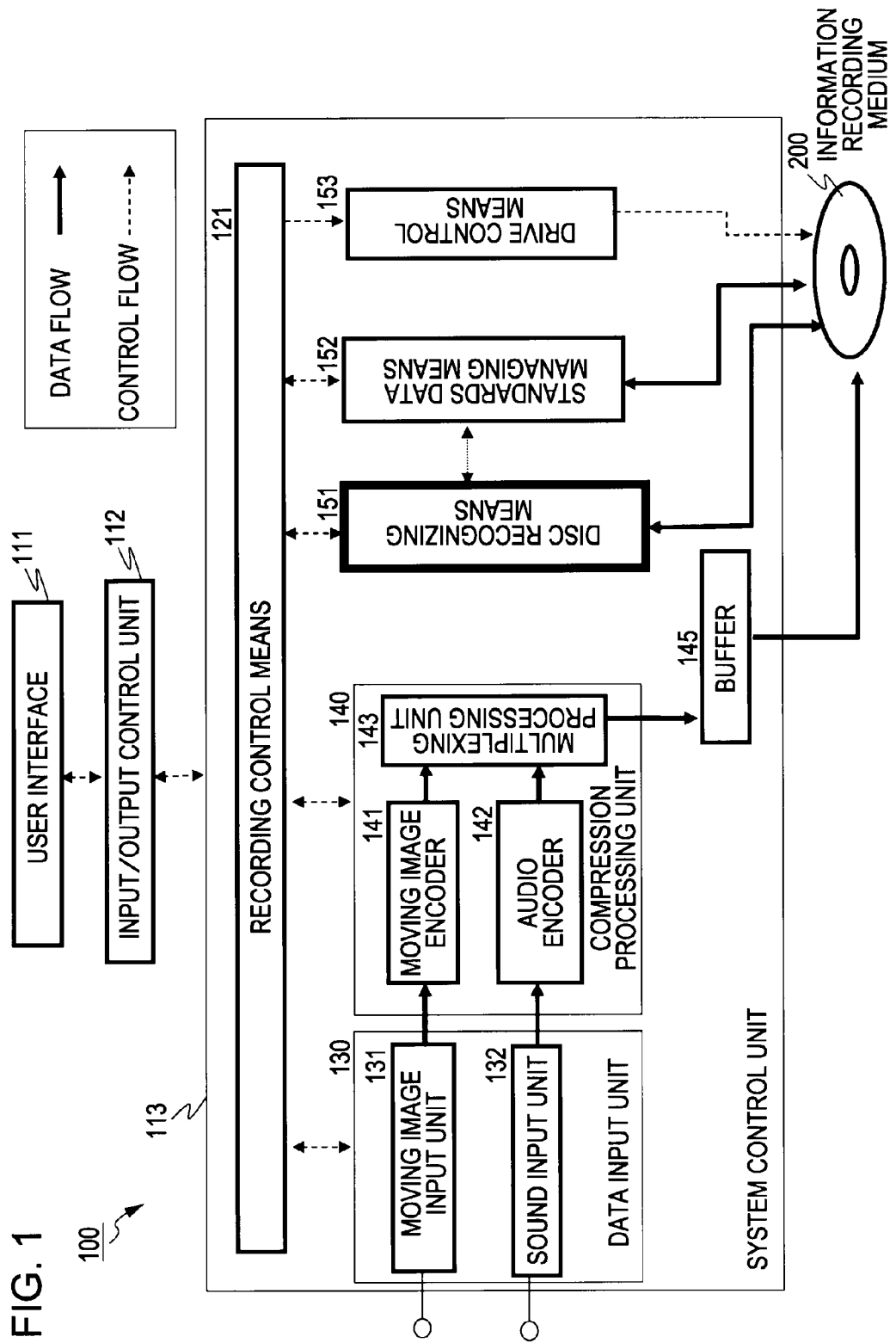
FIG. 1 is a block diagram showing a configuration of an embodiment of an information processing device according to the present invention.

Hereinbelow, the details of an information processing device, an information recording medium, and an information processing method, and a computer program according to the present invention will be described with reference to the drawings. The present invention relates to an information recording medium to which a padding process has been applied in advance, and to an information processing device and an information processing method, and a computer program which execute disc discrimination, such as whether a disc loaded in a device that executes data recording is a pre-formatted disc which has completed a formatting process, a blank disc (disc that is completely unrecorded) which has not completed a physical formatting process, or a used disc, and execute processing based on the discrimination result, for example.

As described in the section of the background art, if many mirror surface portions as data-unrecorded areas remain on a disc such as a DVD, it often becomes impossible to playback the disc on a player that executes a playback process, that is, a typical player having a DVD-ROM drive. Thus, for example, in a recording device such as a video camera, a padding process of recording dummy data into the unrecorded areas is executed. However, this process has a problem in that it takes time. Accordingly, the present invention executes a padding process, that is, writing of dummy data, on a disc in advance and provides the disc to the user. The present invention proposes generating a pre-formatted disc, in which BorderOut and LeadOut are recorded in the case of DVD-RW, and LeadOut is recorded in the case of DVD+RW, at the outer circumference of the disc as physical management information indicating the outer circumference position of the data recording area, and providing this disc to the user as a commercial disc.

However, if such a pre-formatted disc is circulated as a commercial disc, both a blank disc (disc that is completely unrecorded) and a pre-formatted disc exist in the market. If these different types of disc are made commercially available, for example, in a data recording device such as a video camera, it is necessary to recognize which one of the discs a loaded disc is. This is because if the disc is a pre-formatted disc, there is no need to execute a padding process during a formatting process or finalizing process, whereas if the disc is a blank disc (disc that is completely unrecorded), the padding process becomes necessary.

As described above, in the case of an information processing device that loads a disc and performs data recording, it is necessary to switch the contents of processing in accordance with the disc's status or recorded state. More specifically, first, it is necessary to distinguish as to whether an inserted disc is a blank disc, a pre-formatted disc, or an already-recorded disc, and to carry out a logical recognition process after performing a physical formatting process and a logical formatting process in the case of a blank disc, carry out a logical recognition process after performing a logical formatting process in the case of a pre-formatted disc, and carry out a logical recognition process in the case of an already-recorded disc.

Accordingly, another aspect of the present invention is to propose an information processing device that discriminates between a blank disc, a pre-formatted disc, and an already-recorded disc at the time of a disc recognition process, and performs an appropriate recognition process in accordance with the disc type.

Incidentally, compatibility includes a physical compatibility and a logical compatibility. In this specification, the physical compatibility is regarded as indicating a compatibility corresponding to the physical state of a disc as described above, and the logical compatibility is regarded as indicating, for example, a compatibility with application standards such as a DVD-VIDEO standard, a DVD-VIDEO RECORDING standard, and an AVCHD standard, which are standardized as application standards for recording data onto a DVD.

First, referring to FIG. 1, a description will be given of the configuration of an information processing device according to the present invention, that is, an information processing device that loads an information recording medium as a disc such as a DVD and executes data recording. The information processing device according to the present invention executes a process of identifying whether a loaded disc is a blank disc or a pre-formatted disc, or an already-recorded disc.

An information recording medium shown in FIG. 1 is an overwritable and random-writable recording medium. An information processing device 100 shown in FIG. 1 is configured by, for instance, an image capturing device such as a video camera as an example, and executes an information recording process with respect to an information recording medium 200 to which information can be recorded. The information recording medium 200 is, for example, a disc such as a DVD, and is a data-recordable medium.

The information processing device 100 has a user interface 111, an input/output control unit 112, and a system control unit 113. The user interface 111 accepts a user request for a formatting process, start/stop of recording, finalization, ejection of the information recording medium 200, or the like, and outputs a command according to the user request to the system control unit 113 via the input/output control unit 112.

In the system control unit 113 shown in FIG. 1, various kinds of command are inputted from the user interface, and individual processing units or devices/means are controlled in accordance with the input command, thereby controlling the operation of the system as a whole.

In recording control means 121 shown in FIG. 1, various kinds of information are inputted from a data input unit 130, a compression processing unit 140, disc recognizing means 151, and standards data managing means 152, the recording operation sequence is controlled on the basis of the input information, and control information is outputted to the data input unit 130, the compression processing unit 140, the standards managing means 152, and drive control means 153.

The data input unit 130 shown in FIG. 1 has a moving image input unit 131 and an audio input unit 132 and, on the basis of control by the recording control means 121, converts picture and sound signals inputted via unillustrated imaging capturing unit, microphone, and the like, or input signals from other external equipment, into digital signals. The converted digital image signal and digital audio signal are outputted to the compression processing unit 140.

The compression processing unit 140 has a moving image encoder 141, an audio encoder 142, and a multiplexing processing unit 143. On the basis of control by the recording control means 121, the compression processing unit 140 executes an encoding process (compression encoding process) by the moving image encoder 141 and the audio encoder 142 on the moving image and audio data supplied from the data input unit 130, further performs a multiplexing process in the multiplexing processing unit 143, and outputs the result as video data to the buffer 145. The buffer 145 is a non-volatile or volatile memory.

The standards data managing means 152 shown in FIG. 1 performs, on the basis of control by the recording control means 121, generation and analysis of data related to application standards and file system standards that are necessary when recording to the information recording medium 200, and performs input/output of the data with respect to the information recording medium 200. Also, the standards data managing means 152 controls the drive control means 153 via the recording control means 121 to perform an output control for recording user data accumulated in the buffer 145 to an appropriate position on the information recording medium 200.

The drive control means 153 performs control of the information recording medium which is required at the time of reading of data from the information recording medium 200, writing, or the like, on the basis of control information designated by the recording control means 121.

The disc recognizing means 151 shown in FIG. 1 performs analysis of logical format data after discriminating whether the information recording medium 200 loaded in the information processing device 100 is a blank disc, a pre-formatted disc, or an already-recorded disc, and notifies the recording control means 121 of the result.

Incidentally, the information recording medium 200 is either one of a blank disc, a pre-formatted disc, and an already-recorded disc. The definitions of these discs will be described.

(a) A blank disc is a disc that is completely unrecorded. That is, a blank disc is a disc onto which even dummy data has not been recorded.

(b) A pre-formatted disc is a disc in which, among sectors that are the units of data recording set for the disc, all or some of the sectors are subjected to padding with predetermined data (dummy data), that is, recording of dummy data, and as physical management information which is information indicating the data-recording outermost circumference position, [BorderOut] and [LeadOut] are recorded in the case of DVD−RW and [LeadOut] is recorded in the case of DVD+RW.

(c) An already-recorded disc is a disc onto which real data that can be played back has been recorded.

Incidentally, as the major kinds of DVD disc, as shown in FIG. 2, the following kinds exist.

DVD-R: Write-once (written once)
DVD+R: Write-once (written once)
DVD−RW: Rewritable (Erasable and Rewritable)
DVD+RW: Rewritable (Erasable and Rewritable)

The pre-formatted disc according to the present invention is a disc of which all the sectors are subjected to padding with predetermined data (dummy data), that is, recording of dummy data, and which records physical management information indicating the data-recording outermost circumference position. Further, the pre-formatted disc is assumed to be a disc that allows re-recording of data by the user, and can be applied to, for example, one of the following discs.

DVD−RW: Rewritable (Erasable and Rewritable)
DVD+RW: Rewritable (Erasable and Rewritable)

Figure 3:
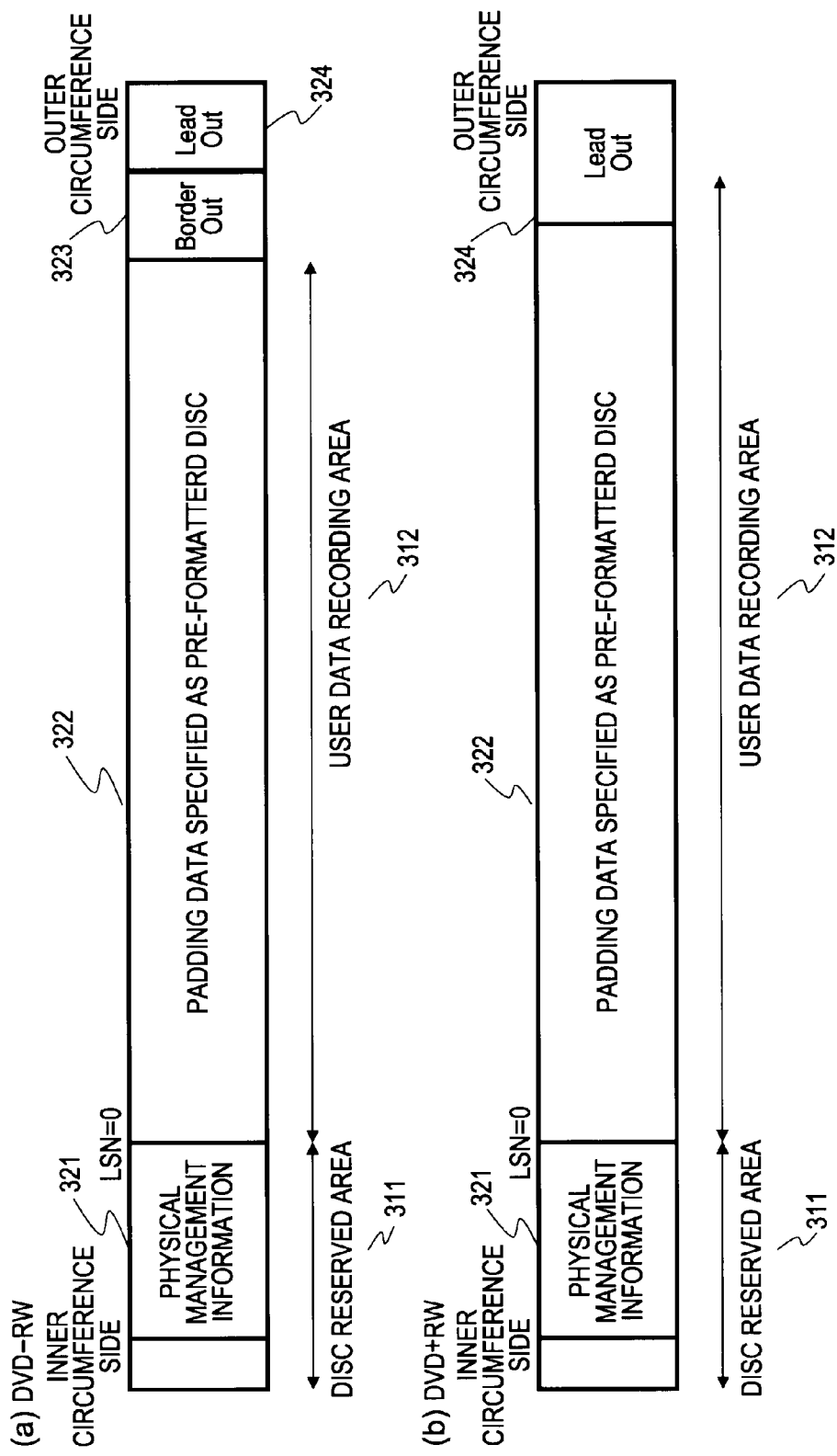
FIG. 3 is a diagram illustrating a configuration example of a pre-formatted disc as an information recording medium according to an embodiment of the present invention.
Figure 4:
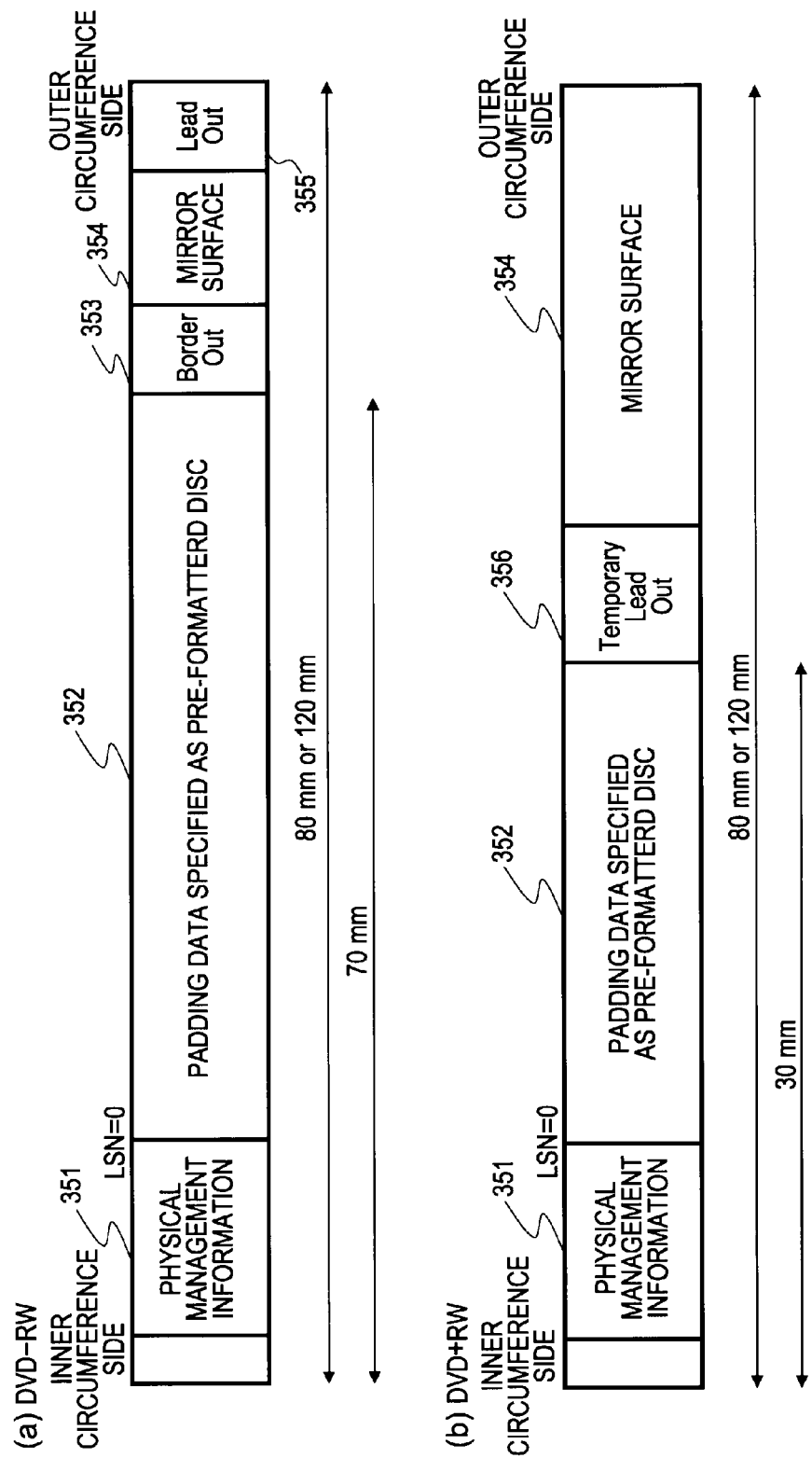
FIG. 4 is a diagram illustrating a configuration example of a pre-formatted disc as an information recording medium according to an embodiment of the present invention.

Referring to FIG. 3 and FIG. 4, a data configuration example of the pre-formatted disc according to the present invention will be described. The example shown in FIG. 3 represents a configuration of a pre-formatted disc of which all the sectors are subjected to padding with predetermined data (dummy data), and the example shown in FIG. 4 represents a configuration example of a pre-formatted disc of which some sectors are subjected to padding with predetermined data (dummy data). The examples respectively show (a) Data configuration example of DVD−RW, and
(b) Data configuration example of DVD+RW.

In the example shown in FIG. 3, a disc reserved area 311 including a recording area for physical management information, which is a recording area for the identification information of a disc or the like, is set at an inner circumference portion of the disc, and a user data recording area 312 is set on the outer circumference thereof. In a typical blank disc, this user data recording area is in a data-unrecorded state, that is, a so-called mirror surface state. In a positional embodiment of a pre-formatted disc as the information recording medium according to the present invention, in this user data recording area, the recording area for padding data (dummy data) which is specified with respect to the pre-formatted disc, that is, a padding data recording area 322 is set, and as physical management information indicating the data-recording outermost circumference position, [BorderOut] 323 and [LeadOut] 324 are recorded in the case of DVD−RW, and the [LeadOut] 324 is recorded in the case of DVD+RW.

Incidentally, as for the data to be recorded in the padding data recording area 322, various recording schemes are possible such as, for example, all-0 data or all-1 data, or data according to a certain rule, for example, data with repetitions of 0s, 1s, 0s, and 1s or the like, or a setting in which data clearly indicating that the disc is a pre-formatted disc (a character string PreFormattedDisc in ASCII code) is recorded at a specific byte point in a given sector.

With this configuration, the mirror surface area is eliminated. Thus, even when there is not much real data recorded, data playback can be performed on many DVD players, that is, typical playback devices having a DVD-ROM drive, without performing an additional padding process on the recording device.

While the example of the pre-formatted disc shown in FIG. 3 represents a configuration in which all of the sectors that can be recorded in the user data recording area are recorded with padding data (dummy data), a configuration is also possible in which, instead of a configuration in which a padding process is applied to all the sectors in this way, recording of predetermined dummy data, that is, a padding process is performed on up to the minimum recording radius required for attaining physical compatibility that enables playback on many players (for example, 70 mm in the case of DVD−RW, and 30 mm in the case of DVD+RW).

This configuration is shown in FIG. 4. In the configuration shown in FIG. 4, instead of a configuration in which all of the user data area set on the outer circumference of physical management information 351 set at the inner circumference portion is used as a padding data recording area, an area with the minimum recording radius required for attaining physical compatibility that enables playback on many players (for example, 70 mm in the case of DVD−RW, and 30 mm in the case of DVD+RW) is set as a padding data recording area 352, and at an outer circumference position thereof, [BorderOut] 353 and [LeadOut] 355 are recorded in the case of DVD−RW, and [TemporaryLeadOut] is recorded in the case of DVD−

RW, as physical management information indicating the data-recording outermost circumference position. Therefore, a mirror surface area 354 remains on the outer circumference side.

With this configuration as well, even when there is not much real data recorded, data playback can be performed on many DVD players, that is, typical playback devices having a DVD-ROM drive, without performing an additional padding process in the recording device.

Incidentally, as for the data to be recorded in the padding data recording area 352, as in the configuration described with reference to FIG. 3, various recording schemes are possible such as, for example, all-0 data or all-1 data, or data according to a certain rule, for example, data with repetitions of 0s, 1s, 0s, and is or the like, or a setting in which data clearly indicating that the disc is a pre-formatted disc (a character string PreFormattedDisc in ASCII code) is recorded at a specific byte point in a given sector.

Incidentally, in the case of a DVD–RW disc, physical formatting according to the RestrictedOverWrite mode is performed as a preliminary physical formatting process. Also, there are three kinds of recording scheme for DVD–RW, including IncrementalRecording, DiscAtOnce, and RestrictedOverWrite, of which RestrictedOverWrite is the only recording scheme that allows overwrites.

Next, referring to FIG. 5 and below, a description will be given of a specific process sequence executed by the information processing device according to the present invention. As described above, the information processing device according to the present invention discriminates whether the information recording medium 200 loaded in the information processing device 100 is a blank disc, a pre-formatted disc, or an already-recorded disc in the disc recognizing means 151 shown in FIG. 1, and further performs analysis of logical format data, notifies the recording control means 121 of the result, and executes processing corresponding to each disc.

First, referring to the flowchart shown in FIG. 5, a description will be given of the sequence of a disc recognition process that is executed in the disc recognizing means 151 shown in FIG. 1. The first process to be executed is a process of determining whether or not a loaded disc is a bank disc. This process is executed in the processing in steps S101 and S102 of the process steps shown in FIG. 5.

First, in step S101, information related to Disc Status contained in the physical management information (see FIG. 3 and FIG. 4) held on a DVD medium is acquired via an ATAPI command. Next, in step S102, it is determined whether or not the Disc Status is Empty.

If it is determined in step S102 that the Disc Status is Empty, the process proceeds to step S103, and the loaded disc is determined to be a blank disc.

If the loaded disc is determined to be a blank disc, after performing a physical formatting process in step S104 and a logical formatting process in step S105, lastly, in step S106, a logical format recognition process is performed to complete disc recognition. Incidentally, the physical formatting process mainly refers to performing initialization by recording physical management information into the disc reserved area (see FIG. 3 and FIG. 4) on the inner circumference side of a DVD. The logical formatting process refers to initializing a disc by recording logical data according to a predetermined application standard into the user data recording area (see FIG. 3 and FIG. 4). Incidentally, as application standards standardized for data recording on a DVD, an AVCHD standard, a DVD-Video standard, a DVD-VideoRecording standard, and the like exist.

FIG. 6 shows the major kinds of application format and their characteristics. As shown in FIG. 6, the major kinds of application format and their characteristics are as follows.

DVD-Video (Abbreviated as VIDEO): Can be played back by many DVD players (has high compatibility).

DVD+RW Video Recording (Abbreviated as +VR): Format suited for moving image recording, has high compatibility, and allows easy editing of recorded content.

DVD Video Recording (Abbreviated as VR): Format suited for real-time recording of moving images, and allows sophisticated editing process such as process utilizing virtual-editing playlist.

AVCHD (Abbreviated as HD): Format suited for recording of High Definition (HD) images The above-mentioned formats exist as the major application formats.

Returning to FIG. 5, the description of the disc recognition process will be continued. In step S102, unless the Disc Status is Empty, it is determined that a loaded disc is not a blank disc, and the process proceeds to step S111.

In step S111, a logical format recognition process is performed, and in step S112, it is determined whether or not recognition by a known application standard has succeeded. That is, it is verified whether or not logical data according to any one of known application standards is recorded on the disc. If the logical data recorded on the disc is successfully recognized by any one of known application standards, disc recognition is completed, and the process proceeds to step S113, where it is determined that the disc is an already-recorded disc on which a recording process corresponding to the application standard with which the recognition has succeeded has been executed, and the process is ended.

If the recognition does not succeed with any of known application standards in step S112, a pre-formatted disc determination process is performed in step S121. The detailed sequence of the pre-formatted disc determination process in step S121 will be described with reference to the flowchart in FIG. 7.

In step S201, it is discriminated whether or not the Disc Status contained in the physical management information (see FIG. 3 and FIG. 4) held on the DVD medium is Complete, and whether or not the disc capacity is equal to or greater than a threshold specified as a pre-formatted disc. Further, it is determined, upon reading several specific sectors, whether or not all of those sectors represent data specified as a pre-formatted disc. If these conditions are satisfied, a disc is determined to be a pre-formatted disc.

Incidentally, as for the padding data to be specified as a pre-formatted disc include, as described above with reference to FIG. 3 and FIG. 4, a data string according to a pre-specified rule, such as all-0 data or all-1 data, or a configuration in which data clearly indicating that the disc is a pre-formatted disc (a character string PreFormattedDisc in ASCII code) is recorded at a specific byte point in a given sector, or the like exists. In step S202 and step S203, a process of verifying if the disc is a pre-formatted disc is performed by executing a reading process of such sector data.

That is, in step S202, reading of data on a plurality of specific sectors is executed, and in step S203, it is checked whether or not all the read sectors represent padding data (for example, 0000 . . . ) specified as a pre-formatted disc. Incidentally, if data clearly indicating that the disc is a pre-formatted disc (a character string PreFormattedDisc in ASCII code) is recorded at a specific byte point, it suffices to read the specific sector and check the character string. However, in the case of a disc configured in this way, in the steps subsequent to recognition as a pre-formatted disc, it is necessary to overwrite the character string with another data.

A description will be given of a concrete example of how to decide a "plurality of specific sectors" in the process of reading the plurality of specific sectors in step S202.

First, there is a method of reading a plurality of arbitrary, random sectors. For example, the total number of sectors on a medium is split equally into a plurality of parts, and sectors at the split points are read. However, with this method, there remains a possibility that those pieces of sector data happen to be data specified as a pre-formatted disc.

Also, as another method, sectors that are surely used in an application standard standardized for data recording onto a DVD may be read. For example, in the AVCHD standard, the DVD-Video standard, the DVD-VideoRecording standard, and the like that are application standards used at the time of recording onto a DVD, a UDF standard is adopted as the file system. In this UDF standard, specified data is always recorded on the next sector after skipping 32 KB from the beginning, and any one of sector 256, the sector at the outermost circumference, and the sector at the outermost circumference minus 256 sectors. By verifying whether or not, as a result of reading these sectors, the resulting data represents data specified as a pre-formatted disc, discrimination between a pre-formatted disc and an already-used disc can be made quickly. With this method, however, there is a possibility that a disc recorded in accordance with an unknown application standard is erroneously recognized as a pre-formatted disc, and thus it is necessary to use the method in combination with the above-mentioned method of reading sectors at split points, or the like.

If it is verified in the determination process in step S203 that information on the read sectors represents padding data specified as a pre-formatted disc, the process proceeds to step S205, and it is determined in the end that the disc is a pre-formatted disc. On the other hand, if it is verified that information on the read sectors does not represent padding data specified as a pre-formatted disc, the process proceeds to step S204, and it is determined that the disc is neither a blank disc nor a pre-formatted disc.

Figure 5:
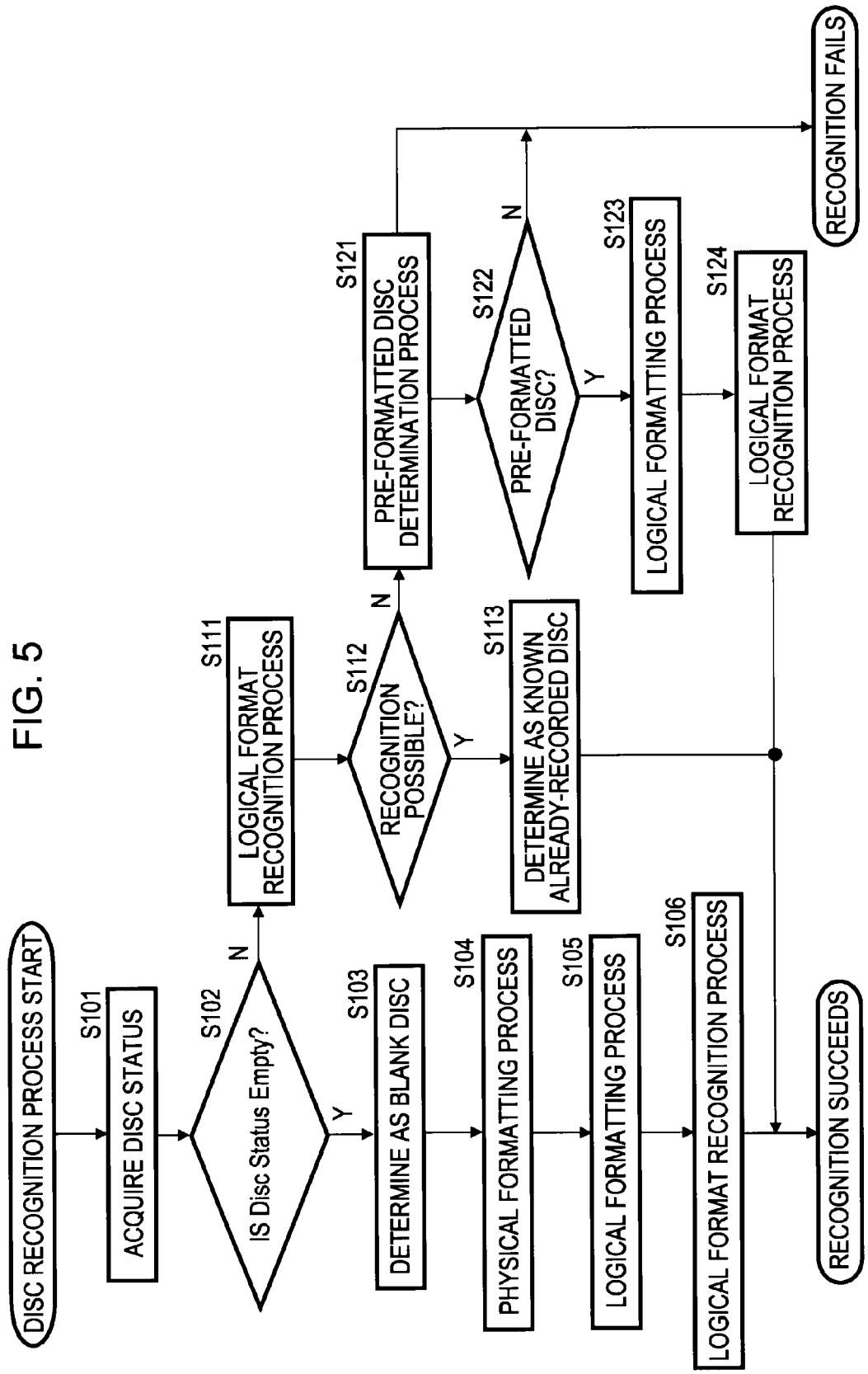
FIG. 5 is a diagram showing a flowchart illustrating the sequence of processes executed by an information processing device according to an embodiment of the present invention.

The process in the case when it is verified that the information on the read sectors is not the padding data specified as a pre-formatted disc corresponds to determining as No in the determination process in step S122 shown in FIG. 5, so the recognition is regarded as failed and the disc recognition process is ended.

On the other hand, if it is determined in the end in step S205 shown in FIG. 7 that the disc is a pre-formatted disc, this corresponds to determining as Yes in the determination process in step S122 shown in FIG. 5, and the process proceeds to step S123 to perform a logical formatting process. Incidentally, since logical format data is not recorded on the pre-formatted disc assumed in the present invention at the time of pre-formatting, it is possible for the user to select a desired application standard at the time of the first disc recognition.

Of course, even if logical format data is previously recorded in accordance with a specific application standard at the time of pre-formatting, it is possible to perform a logical formatting process again. However, in this case, the determination of whether the disc is a pre-formatted disc or a used disc becomes difficult, thus making it necessary for the user to actively perform a re-formatting process after disc recognition.

After the logical formatting process is completed in step S123, the process proceeds to step S124, where a logical format recognition process is executed, and disc recognition is completed.

In this way, the information processing device according to the present invention executes a process of identifying whether a disc loaded in the device is a blank disc, a pre-formatted disc, or an already-recorded disc. Thus, for example, if the disc is discriminated as being a pre-formatted disc, the padding process is omitted in the initialization of the disc. Through this process, the time required for the initialization process of the disc can be shortened.

Also, if the disc is discriminated as being a pre-formatted disc, the padding process during the finalizing process which is executed in conventional devices is not performed. In the case of conventional devices, it is necessary to perform a padding process to ensure broad compatibility with consumer DVD recording and playback equipment. However, according to the configuration of the present invention, if the disc is discriminated as being a pre-formatted disc in the disc recognition process, then it is recognized that a padding process is unnecessary, so it is possible to omit the padding process during finalization, thus simplifying post-processing performed after recording. That is, the time required for finalization is shortened. Incidentally, in the case of an application standard or the like in which only padding is executed in the finalizing process, the finalizing process itself becomes unnecessary.

Also, when the pre-formatted disc according to the present invention is used, it is possible to prompt the user to select a desired logical format at the time of the first disc recognition on the information processing device, thus enabling efficient processing.

Also, in the case of a −RW disc, random access to an arbitrary sector is not allowed on an unrecorded blank disc. A restriction is placed such that after performing initialization in the RestrictedOverWrite mode, data is recorded into the mirror surface area in order from the inner circumference side of the medium, and random access can be made to only an area into which data has been recorded once. However, when the pre-formatted disc according to the present invention is used, there is an advantage in that an already-padded area can be accessed also in the case of a −RW disc, and in the case of a pre-formatted disc whose entire surface has already been padded, random access can be made across the entire medium from the beginning.

The present invention has been described above in detail with reference to a specific embodiment. However, it is obvious that modifications and substitutions can be made to the embodiment by those skilled in the art without departing from the scope of the present invention. That is, the present invention has been described by way of example, and should not be construed restrictively. The scope of the present invention should be determined by reference to the claims recited at the beginning.

Incidentally, the series of processes described in this specification can be executed by hardware or software, or a composite configuration of both. If processes by software are to be executed, a program recording the process sequence can be executed by being installed into a memory within a computer embedded in dedicated hardware, or can be executed by installing the program into a general-purpose computer that can execute various processes.

For example, the program can be pre-recorded on a hard disk or a ROM (Read Only Memory) as a recording medium. Alternatively, the program can be stored (recorded) temporarily or permanently on a removable recording medium such as a flexible disc, a CD-ROM (Compact Disc Read Only Memory), an MO (Magneto-optical) disc, a DVD (Digital Versatile Disc), a magnetic disc, or a semiconductor memory.

Such a removable recording medium can be provided as so-called package software.

Incidentally, other than being installed into a computer from the above-described removable recording medium, the program can be wireless-transferred to a computer from a download site, or transferred by wire to a computer via a network such as the LAN (Local Area Network) or the Internet. The computer receives the program thus transferred and installs the program into a built-in recording medium such as a hard disk.

Incidentally, the various processes described in this specification may be executed not only time sequentially in the order as they appear in the description but may be executed in a parallel fashion or independently depending on the throughput of the device executing the processes. Also, the term system as used in this specification refers to a logical collection of a plurality of devices, and is not limited to one in which the individual component devices are located within the same housing.

INDUSTRIAL APPLICABILITY

As described above, according to a configuration of an embodiment of the present invention, in an information processing device that executes data recording onto a disc, for example, a video camera or the like, a process of identifying which one of the following discs a loaded disc is, that is, whether the loaded disc is (a) an unrecorded blank disc, (b) a pre-formatted disc to which a padding process has been applied, or (c) an already-recorded disc, is executed as a process of recognizing the loaded disc. This configuration enables handling of a pre-formatted disc that is an information recording medium according to an embodiment of the invention of the present application. Also, when the pre-formatted disc is used, a padding process that needs to be executed during a formatting process or finalizing process in conventional devices becomes unnecessary, thus enabling quick processing without making the user wait during the start of recording or finalizing process. Further, since only a padding process is applied in advance to the pre-formatted disc that is an information recording medium according to an embodiment of the invention of the present application without limiting its logical format, the logical format can be selected at the time of its initial use.

The invention claimed is:

1. An information processing device into which an information recording medium is loaded, the information recording medium being rewritable and requiring a finalizing process for allowing playback of recorded data on another playback device, comprising:
a determining unit, including a processor, configured to determine if the loaded information recording medium is a pre-formatted disc in which a padding process as a part of the finalizing process has been applied to every sector up to a minimum recording radius.

2. The information processing device according to claim 1, wherein the determining means determines if the recording medium is a blank disc on which no data is recorded, on the basis of physical management information recorded on the recording medium.

3. The information processing device according to claim 1, wherein the determining means executes a process of identifying a type of logical format of the recording medium, and determines that the recording medium is a pre-formatted disc if it is determined that the logical format of the recording medium is not a predetermined format.

4. The information processing device according to claim 1, wherein the determining means reads data of a predetermined size from a predetermined area of the recording medium, and determines that the recording medium is the pre-formatted disc if it is determined that the data is pre-specified recorded information corresponding to a pre-formatted disc, in a determination process of determining if the recording medium is a pre-formatted disc.

5. The information processing device according to claim 1, wherein the determining means reads data of a predetermined size from a predetermined area of the recording medium, and determines that the recording medium is the pre-formatted disc if it is determined that descriptive information indicating that the recording medium is a pre-formatted disc is contained in the data, in a determination process of determining if the recording medium is a pre-formatted disc.

6. An information recording medium which is rewritable and requires a finalizing process for allowing playback of recorded data on another playback device, comprising:
a user data recording area of the information recording medium, and
a padding data area that records pre-specified data as information indicating that the information recording medium is a pre-formatted disc, the padding data area including every sector up to a minimum recording radius,
wherein an information processing device that records data onto the information recording medium recognizes that the information recording medium is the pre-formatted disc on the basis of the data recorded in the padding data area.

7. The information recording medium according to claim 6, wherein the information recording medium is an optical recording medium.

8. The information recording medium according to claim 7, wherein information indicating a data recording range is recorded at the end of the padding data area.

9. An optical information recording medium which is rewritable and requires a finalizing process for allowing playback of recorded data on another playback device, comprising:
a user data recording area of the information recording medium, and
a padding data area that records pre-specified data as information indicating that the information recording medium is a pre-formatted disc, the padding data area set so as not to leave a mirror surface area as a data-unrecorded area on the optical recording medium,
wherein an information processing device that records data onto the information recording medium recognizes that the information recording medium is the pre-formatted disc on the basis of the data recorded in the padding data area.

10. An optical information recording medium which is rewritable and requires a finalizing process for allowing playback of recorded data on another playback device, comprising:
a user data recording area of the information recording medium, and
a padding data area that records pre-specified data as information indicating that the information recording medium is a pre-formatted disc, the padding data area set so as to partially leave a mirror surface area as a data-unrecorded area at the end of the recording area on the optical recording medium, wherein an information processing device that records data onto the information recording medium recognizes that the information recording medium is the pre-formatted disc on the basis of the data recorded in the padding data area.

11. An information processing method which is executed in an information processing device into which an information recording medium is loaded, the information recording medium being rewritable and requiring a finalizing process for allowing playback of recorded data on another playback device, comprising:
 determining, by a processor, if the information recording medium loaded in the information processing device is a pre-formatted disc in which a padding process as a part of the finalizing process has been applied to every sector up to a minimum recording radius.

12. The information processing method according to claim 11, wherein the determining includes determining if the recording medium is a blank disc on which no data is recorded, on the basis of physical management information recorded on the recording medium.

13. The information processing method according to claim 11, wherein the determining includes identifying a type of logical format of the recording medium, and determining that the recording medium is a pre-formatted disc if it is determined that the logical format of the recording medium is not a predetermined format.

14. The information processing method according to claim 11, wherein the determining includes reading data of a predetermined size from a predetermined area of the recording medium, and determining that the recording medium is the pre-formatted disc if it is determined that the data is pre-specified recorded information corresponding to a pre-formatted disc, in a determination process of determining if the recording medium is a pre-formatted disc.

15. The information processing method according to claim 11, wherein the determining includes reading data of a predetermined size from a predetermined area of the recording medium, and determining that the recording medium is the pre-formatted disc if it is determined that descriptive information indicating that the recording medium is a pre-formatted disc is contained in the data, in a determination process of determining if the recording medium is a pre-formatted disc.

16. A non-transitory computer readable medium encoded with a computer program for causing an information processing method to be executed in an information processing device into which an information recording medium is loaded, the information recording medium being rewritable and requiring a finalizing process for allowing playback of recorded data on another playback device, the method comprising:
 determining if the information recording medium loaded in the information processing device is a pre-formatted disc in which a padding process as a part of the finalizing process has been applied to every sector up to a minimum recording radius.

17. The information processing device according to claim 1, wherein the determining unit determines if the loaded information recording medium is the pre-formatted disc in which the padding process as the part of the finalizing process has been applied to every sector on the medium.

18. The information processing device according to claim 1, wherein the minimum recording radius is 30 mm for a DVD+RW type medium and 70 mm for a DVD−RW type medium.

* * * * *